United States Patent
Zimowski (12) 
(10) Patent No.: US 6,832,368 B1
(45) Date of Patent: Dec. 14, 2004

(54) METHOD AND SYSTEM FOR ENHANCING THE PERFORMANCE OF INTERPRETED WEB APPLICATIONS

(75) Inventor: Melvin Richard Zimowski, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,157

(22) Filed: Feb. 8, 2000

Related U.S. Application Data (60) Provisional application No. 60/120,550, filed on Feb. 17, 1999.

(51) Int. Cl.$^7$ ................................................. G06F 9/45
(52) U.S. Cl. ........................ 717/139; 717/136; 717/114; 717/115
(58) Field of Search ................................ 709/217, 218, 709/219; 707/100, 103; 711/113, 150, 1

(56) References Cited

U.S. PATENT DOCUMENTS

| | | | |
|---|---|---|---|
| 5,287,548 A | | 2/1994 | Flood et al. |
| 5,734,837 A | | 3/1998 | Flores et al. |
| 5,748,961 A | * | 5/1998 | Hanna et al. ............... 717/145 |
| 5,761,511 A | | 6/1998 | Gibbons et al. |
| 5,838,980 A | | 11/1998 | Guillen et al. |
| 5,867,153 A | | 2/1999 | Grandcolas et al. |
| 5,887,151 A | * | 3/1999 | Raz et al. .................... 712/206 |
| 5,889,996 A | * | 3/1999 | Adams ........................ 717/139 |
| 6,035,298 A | * | 3/2000 | McKearney ................. 707/10 |
| 6,178,438 B1 | * | 1/2001 | Tschirhart et al. .......... 709/200 |
| 6,237,005 B1 | * | 5/2001 | Griffin ......................... 707/102 |
| 6,256,784 B1 | * | 7/2001 | Grove ............................ 717/9 |
| 6,470,349 B1 | * | 10/2002 | Heninger et al. ............ 707/102 |

* cited by examiner

Primary Examiner—Jack B. Harvey
Assistant Examiner—Beatriz Prieto
(74) Attorney, Agent, or Firm—Gates & Cooper LLP (57) ABSTRACT

A system, method, and article of manufacture for caching a pre-processed version of an interpreted application at the time the interpreted application is first interpreted and executed by a computer, thereby improving response time for subsequent executions of the interpreted application. The pre-processed version of the interpreted application captures all execution paths through the interpreted application, despite the fact that the first execution of the interpreted application may only exercise a subset of the possible execution paths therein. Modifications to the interpreted application are dynamically detected, so that the pre-processed version can be replaced in the cache as needed.

30 Claims, 8 Drawing Sheets

METHOD AND SYSTEM FOR ENHANCING THE PERFORMANCE OF INTERPRETED WEB APPLICATIONS

CROSS-REFERENCE TO RELATED APPLICATIONS

This application claims the benefit under 35 U.S.C §119 (e) of co-pending and commonly-assigned U.S. Provisional application Ser. No. 60/120,550, entitled "METHOD AND SYSTEM FOR ENHANCING THE PERFORMANCE OF INTERPRETED WEB APPLICATIONS," filed on Feb. 17, 1999, by Melvin R. Zimowski, which application is incorporated by reference herein.

BACKGROUND OF THE INVENTION

1. Field of the Invention

This invention relates in general to accessing a database or executing a command over the Internet, and in particular, to a method and system for enhancing the performance of interpreted Web applications.

2. Description of Related Art

With the fast growing popularity of the Internet and the World Wide Web (also known as "WWW" or the "Web"), there is also a fast growing demand for Web applications. For example, U.S. Pat. No. 5,737,592 describes a method and apparatus for executing SQL (Structured Query Language) queries in a relational database management system (RDBMS) via the Web. Web users can request information from the RDBMS via HTML (HyperText Markup Language) input forms, which request is then used by an interpreted macro language file to create an SQL statement for execution by the RDBMS. The results output by the RDBMS are themselves transformed using the macro language file into HTML format for presentation to the Web user.

An application that is interpreted when executed offers a high degree of flexibility to developers and installers of the application because any changes that are made to the application take effect immediately. An interpretive execution environment also offers a high degree of flexibility to users, because users can provide input that alters the execution of the application or even make dynamic changes to the application itself at the time they request execution of the application.

However, the performance of interpreted applications is constrained by the parsing costs that are typically incurred for each execution of the application. These costs can be considerable and may limit the usefulness of the applications within production environments, and in particular, within production environments where customer acceptance of the applications is dependent on acceptable response time. Thus, the value of the flexibility described above is lost.

There is a need in the art for techniques that improve the performance of interpreted Web applications without sacrificing the flexibility that this style of application makes available to application programmers, installers, and users of the application.

SUMMARY OF THE INVENTION

To overcome the limitations in the prior art described above, and to overcome other limitations that will become apparent upon reading and understanding the present specification, the present invention discloses a system, method, and article of manufacture for caching a pre-processed version of an interpreted application at the time the interpreted application is first interpreted and executed by a computer, thereby improving response time for subsequent executions of the interpreted application. The pre-processed version of the interpreted application captures all execution paths through the interpreted application, despite the fact that the first execution of the interpreted application may only exercise a subset of the possible execution paths therein. Modifications to the interpreted application are dynamically detected, so that the pre-processed version can be replaced in the cache as needed.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention describes the caching of a pre-processed (i.e., tokenized) version of an interpreted application (i.e., a macro language file) in a memory cache of a computer at the time the interpreted application is first interpreted and executed by the computer, thereby improving response time for subsequent executions of the interpreted application. In a preferred embodiment, the interpreted application comprises a macro language file, and the pre-processed version comprises a tokenized version of the macro language file. The macro language file may be of similar type as that described in U.S. Pat. No. 5,737,592, filed on Jun. 19, 1995, by Nguyen et al., issued on Apr. 7, 1998, entitled "ACCESSING A RELATIONAL DATABASE OVER THE INTERNET USING MACRO LANGUAGE FILES", and owned by IBM Corporation, the assignee of the present invention, which patent is incorporated by reference herein. Of course, the present invention is not restricted to such macro language files or pre-processed versions, and could be used with other applications as well.

The tokenized version captures all execution paths through the macro language file, despite the fact that the first or any subsequent execution of the macro language file may only exercise a subset of the possible execution paths therein. The approach taken eliminates the I/O (input/output) cost as well as the cost of tokenizing the macro language file for each subsequent execution. The present invention also dynamically detects the installation of new versions of the macro language file and automatically replaces the tokenized version in the cache as needed.

Hardware and Software Environment

Figure 1:
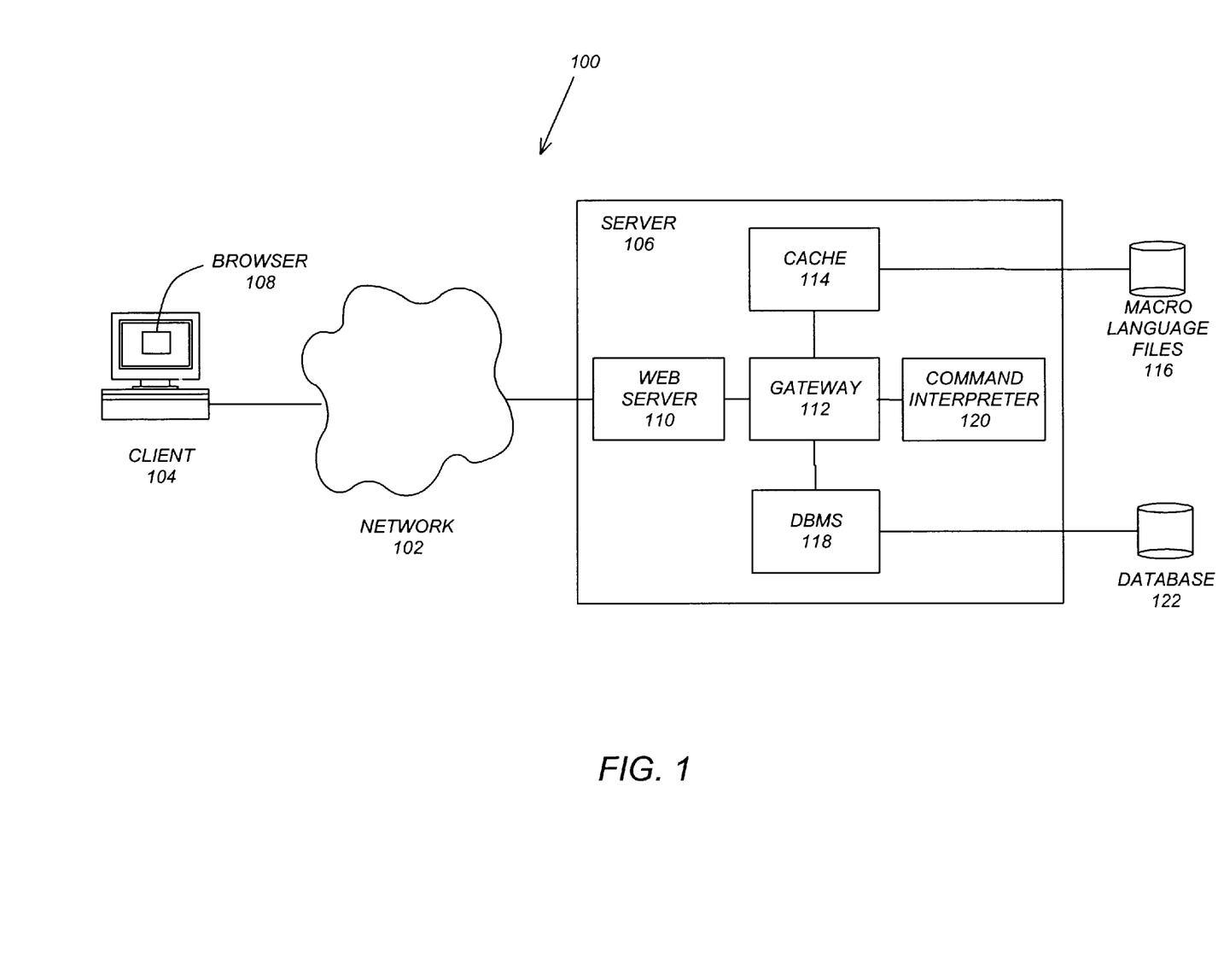
FIG. 1 schematically illustrates the hardware and software environment of the preferred embodiment of the present invention.

FIG. 1 schematically illustrates the hardware and software environment of the preferred embodiment of the present invention, and more particularly, illustrates a typical distributed computer system 100 using a network 102 to connect client computers 104 to server computers 106. A typical combination of resources may include a network 102 comprising the Internet, LANs, WANs, SNA networks, or the like, clients 104 that are personal computers or workstations, and servers 106 that are personal computers, workstations, minicomputers, or mainframes.

In the preferred embodiment, the Internet 102 connects client computers 104 executing Web browsers 108 to server computers 106 executing Web servers 110. The Web browser 108 is typically a program such as Netscape's Navigator or Microsoft's Internet Explorer. The Web server 110 is typically a program such as IBM's HyperText Transport Protocol (HTTP) Server or Microsoft's Internet Information Server.

In the preferred embodiment, the servers 106 also execute a Net.Data gateway 112, which includes a cache 114 for storing macro language files 116 (i.e., interpreted applications) interpreted by the Net.Data gateway 112. The Net.Data gateway 112 interfaces between the Web server 110 and a database management system (DBMS) 118 or a command interpreter 120. The Net.Data gateway 112 interprets one or more of the macro language files 116 in response to a request received from the Web server 110, and the interpreted macro language files 116 access the database 122 through the DBMS system 118 or execute a command through the command interpreter 120 in order to provide content to the Web server 110. Those skilled in the art will recognize that the command interpreter 120 could be a program such as a Perl interpreter, a REXX interpreter, or some other command interpreter 120.

The cache 114, which is stored in a memory of the server computer 106 that is accessible by the Net.Data gateway 112, stores tokenized versions of the macro language files 116 for subsequent execution by the Net.Data gateway 112, wherein the tokenized versions of the macro language files 116 capture all execution paths through the macro language files 116. Moreover, modifications to the macro language files 116 are dynamically detected by the Net.Data gateway 112, so that the tokenized version can be replaced in the cache 114 as needed.

The Net.Data gateway 112, DBMS 118, and/or command interpreter 120 maybe located on the same server 106 as the Web server 110, or the DBMS 118 may be located on a different machine than the Net.Data gateway 112 and command interpreter 120. The servers 106 executing the Web server 110, Net.Data gateway 112, DBMS 118, and command interpreter 120 may also comprise different vendor systems. Those skilled in the art will recognize many modifications may be made to this configuration without departing from the scope of the present invention.

Net.Data Gateway

The Net.Data gateway 112 is designed to be sufficiently flexible and powerful, yet be available on multiple platforms, such as OS/390™, MVS™, AIX™, OS/2™, Linux™, Windows™, etc. Further, the Net.Data gateway 112 is designed to work with existing Web and database application development tools, with minimal modifications required to such tools.

These goals led also to the development of the macro language files 116 of the present invention. The macro language files 116 comprise a combination of Net.Data macro language statements, HTML, Javascript, and language environment statements (e.g., SQL, Perl, REXX, etc.) that allow input data from an HTML input form to affect the execution of the macro language file 116 and possibly be integrated in an SQL statement for processing at the DBMS 118 or into a command for processing at the command interpreter 120, and also allows the results to be merged into the Web page being generated by Net.Data. More information on the macro language files 116 can be found in U.S. Pat. No. 5,737,592, filed on Jun. 19, 1995, by Nguyen et al., issued on Apr. 7, 1998, entitled "ACCESSING A RELATIONAL DATABASE OVER THE INTERNET USING MACRO LANGUAGE FILES", and owned by IBM Corporation, the assignee of the present invention, which patent is incorporated by reference herein.

The runtime engine of the Net.Data gateway 112 reads the macro language files 116 to generate the appropriate input forms, SQL statements, commands, and Web pages. The use of native HTML, SQL, and commands, instead of a new or hybrid language, allows the full expressive power of these languages to be used without artificial limitations.

Moreover, existing tools maybe used to generate the macro language files 116. For example, HTML editors from various vendors can be used to generate HTML forms, while SQL tools, such as IBM's Net.Data SQL Assist, can be used to generate the SQL statements.

Operation of the System

During operation of the system 100, the user interacts with the Web browser 108 executing on a client 104. At some point, the user executes a command via the Web browser 108 that results in communication with the Web server 110. The Web server 110 would then transmit a page in HTML format to the Web browser 108 for presentation to the user. The Net.Data gateway 112 would be invoked, for example, by the user selecting a hypertext link from the page. The Net.Data gateway 112 supports the Common Gateway Interface (CGI) defined for Web servers 110, as well as various other interfaces, and thus can be invoked from an HTML page in one of two ways: either by an HTTP link or by an HTTP form.

An HTTP link would typically be formatted as follows: "<A HREF=http://{Web-server}/{Net.Data-invocation-path}/{macro-language-file}/{HTML-section} [variable-name=variable-value & . . . ]>".

An HTTP form would typically be formatted in a similar manner as follows: "<FORM METHOD={method}ACTION=http://{Web-server}/{Net.Data-invocation-path}/{macro-language-file}/{HTML-section} [?variable-name=variable-value & . . . ]>".

In both of the above examples, the following parameters are used:

"{Web-server}" identifies the Web server 110.

{Net.Data-invocation-path}" identifies the Net.Data gateway 112.

"{macro-language-file}" is the name of the macro language file 116 to be interpreted.

"{HTML-section}" is the HTML-section. If the HTML section is for gathering input, then HTML-section designates a section of the macro language file 116 that contains an HTML input form to be displayed to the end user. If the HTML section is for displaying results, then some combination of SQL statements and other commands in the macro language file 116 are executed and a Web page containing the results is displayed to the end user.

"{method}" is "POST", as specified under the HTML standard.

"[?variable-name=variable-value & . . . ]" are optional parameters that may be passed to the Net.Data gateway 112.

At some point in the interaction between the Web browser 108, the Web server 110, and the Net.Data gateway 112, the user requests the execution of an HTML-section within a macro language file 116. The Net.Data gateway 112 retrieves the specified macro language file 116, extracts an HTML input form from the macro language file 116, and transmits the HTML input form to the Web server 110. The Web server 110 then transmits the HTML input form to the Web browser 108 for display to the user.

The user manipulates the HTML input form via the Web browser 108, by selecting functions and/or entering data into input boxes. When the user invokes a "submit" or "post" command, the data from the HTML input form, along with the command, is transmitted from the Web browser 108 to the Web server 110. The command generally includes a universal resource locator (URL) that invokes communications between the Web server 110 and the Net.Data gateway 112.

The Net.Data gateway 112 extracts the user inputs from the HTML input form, retrieves and interprets the associated macro language file 116, and then typically substitutes these input values into an SQL statement or command from the macro language file 116. The Net.Data gateway 112 then transmits the SQL statements or other commands to the DBMS 118 or command interpreter 120, respectively, for execution. After executing the SQL statements or other commands, the DBMS 118 or command interpreter 120 returns the results of the execution to the Net.Data gateway 112. The Net.Data gateway 112 then executes an HTML-section within this macro language file 116 as specified in the "POST" command to build a Web page containing the results. The resulting Web page is transmitted by the Net.Data gateway 112 to the Web server 110. The Web server 110 then transmits the Web page to the Web browser 108 for presentation to the user. This interaction between the Web browser 108, the Web server 110, the Net.Data gateway 112, and the DBMS 118 or command interpreter 120 may continue in a similar manner according to the user's direction.

Caching of the Macro Language File

The purpose of the present invention is to provide for the caching 114 of the macro language files 116 by the Net.Gateway 112 in order to enhance performance. The Net.Data gateway 112 generates tokenized versions of macro language files 116, as well as files referenced therein, which are cached 114 for subsequent reuse. This caching 114 eliminates the costs associated with the repeated reading of the macro language files 116 from disk and the tokenizing of the macro language files 116 for each user request.

Macro Language File

Figure 2:
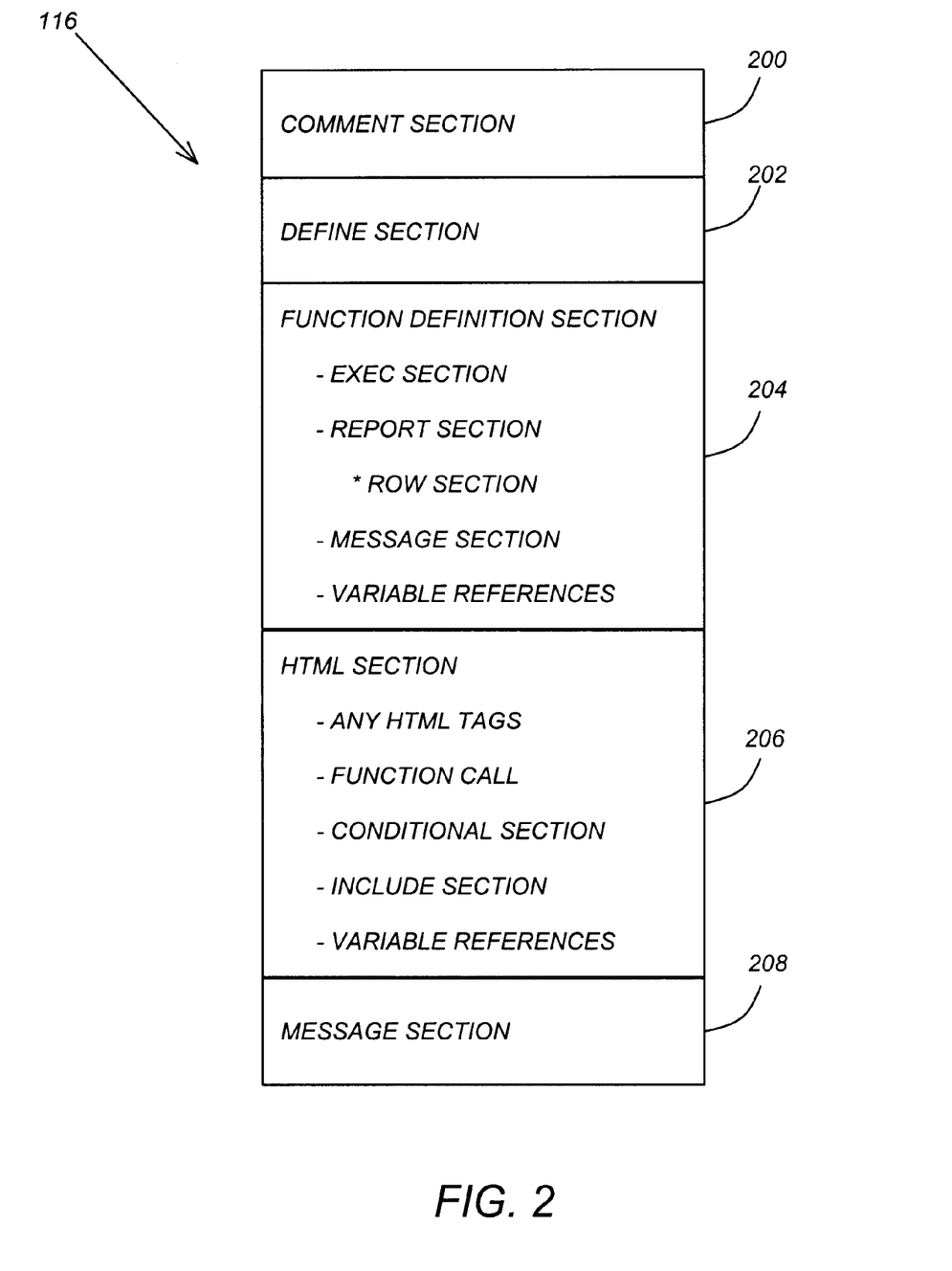
FIG. 2 schematically illustrates the structure of a macro language file according to the preferred embodiment of the present invention.

FIG. 2 illustrates the structure of the macro language file 116 according to the preferred embodiment of the present invention. The macro language file 116 may include one or more comment sections 200, define sections 202, function definition sections 204, HTML sections 206, and message sections 208. The function definition section 204 includes an exec section, one or more report sections, each with a row section, one or more message sections, and variable references. The HTML section 206 includes HTML tags, and may include function calls, conditional sections, include sections, and variable references.

Caching Directives

Generally, macro language files 116 are cached 114 in accordance with caching 114 directives specified during the initialization of the Net.Data gateway 112:

DTW-CACHE-MACRO: a directive within the initialization file for the Net.Data gateway 112 that identifies macro language files 116 that are to be cached 114; and DTW-DO-NOT-CACHE-MACRO: a directive within the initialization file for the Net.Data gateway 112 that identifies macro language files 116 that are not to be cached 114.

Tokenizing Function

When a macro language file 116 that is to be cached is first executed, a lexical analyzer function of the Net.Data gateway 112 tokenizes the entire macro language file 116 (i.e., tokenizes all execution paths through the macro language file 116). Tokenizing refers to scanning the characters that comprise the macro language file 116 and recognizing character sequences that, when grouped together properly, have meaning to the Net.Data gateway 112. If the macro language file 116 is one identified for caching 114, the tokenized version is stored in the cache 114; otherwise, the tokenized version is stored in a temporary location in the memory of the server 106.

While the lexical analyzer tokenizes the entire macro language file 116, it returns the tokens required for the execution path currently being taken through the macro language file 116 to a parser function of the Net.Data gateway 112 for further processing as part of the current user request. Specifically, the tokens returned depend on the current user request as well as the programming logic of the macro language file 116.

When a macro language file 116 that has been previously cached 114 is subsequently executed, the parser invokes a cache retrieval routine of the Net.Data gateway 112 that retrieves the tokenized version directly from the cache 114 (i.e., the lexical analyzer is not invoked again). The cache retrieval routine only returns those tokens to the parser that are associated with the current execution path through the macro language file 116. Note also that a security check is made by the Net.Data gateway 112 to determine whether the current user has the authorization to execute the cached macro language file 116.

Include Files

Any INCLUDE-file referenced in an include section of a macro language file 116 being cached 114 is cached 114 separately. However, if an INCLUDE-file is remotely located, then it is never cached 114, because the Net.Gateway 112 cannot determine whether modifications have been made to the remote INCLUDE-file.

When the macro language file 116 to be cached 114 is first executed and the lexical analyzer discovers an include section, the lexical analyzer suspends its processing of the macro language file 116. Macro language file 116, cache 114 buffer, and lexical analyzer stack state information is saved, so that processing can later resume at the point of suspension. The lexical analyzer then checks to see whether the INCLUDE-file has already been cached 114. If the INCLUDE-file has been cached 114 and the cached 114 version is still current, then the lexical analyzer returns tokens from the cached 114 INCLUDE-file to the parser for the current execution path. Otherwise, the lexical analyzer tokenizes all execution paths through the INCLUDE-file, saves the tokenized version in the cache 114, and returns the tokens required for the execution path currently being taken through the INCLUDE-file to the parser for further processing as part of the current user request. When processing of the INCLUDE-file is complete, the lexical analyzer resumes processing of the macro language file 116.

When a macro language file 116 that has been cached 114 is subsequently executed and the cache retrieval routine discovers an include section, the routine suspends its processing of the cached 114 macro language file 116. The cache 114 buffer, cache buffer state information, and the cache retrieval routine stack state information are saved, so that processing can later resume at the point of suspension. The cache retrieval routine then checks to see whether the cached 114 version of the INCLUDE-file is still current. If still current, then the cache retrieval routine returns tokens from the cached 114 INCLUDE-file to the parser. Otherwise, the lexical analyzer tokenizes the INCLUDE-file, saves the tokenized version in the cache 114, and returns the tokens required for the execution path currently being taken through the INCLUDE-file to the parser for further processing as part of the current user request. When processing of the INCLUDE-file is complete, the cache retrieval routine resumes processing of the cached 114 macro language file 116. Note that, since an include section may be present within an include section, this processing may be recursive.

Remotely-Located Include Files

When the macro language file 116 to be cached 114 is first executed and the lexical analyzer discovers a remotely-located INCLUDE-file (known as an INCLUDE-URL), the lexical analyzer suspends its processing of the macro language file 116. Macro language file 116, cache 114 buffer, and lexical analyzer stack state information is saved, so that processing can later resume at the point of suspension. Since INCLUDE-URLs are never cached 114, the lexical analyzer tokenizes the INCLUDE-URL, returning tokens required for the execution path currently being taken through the INCLUDE-file to the parser for further processing as part of the current user request. When processing of the INCLUDE-URL is complete, the lexical analyzer resumes processing of the macro language file 116.

When a macro language file 116 that has been cached 114 is subsequently executed and the cache retrieval routine discovers an INCLUDE-URL, the cache retrieval routine suspends its processing of the cached 114 macro language file 116. The cache 114 buffer, cache buffer state information, and the cache retrieval routine stack state information are saved, so that processing can later resume at the point of suspension. Since INCLUDE-URLs are never cached 114, the lexical analyzer tokenizes the INCLUDE-URL, returning tokens required for the execution path currently being taken through the INCLUDE-file to the parser for further processing as part of the current user request. When processing of the INCLUDE-URL is complete, the cache retrieval routine resumes processing of the cached 114 macro language file 116. Note that, since an INCLUDE-URL maybe present within an INCLUDE-URL, this processing may be recursive.

Hash Table

Figure 3:
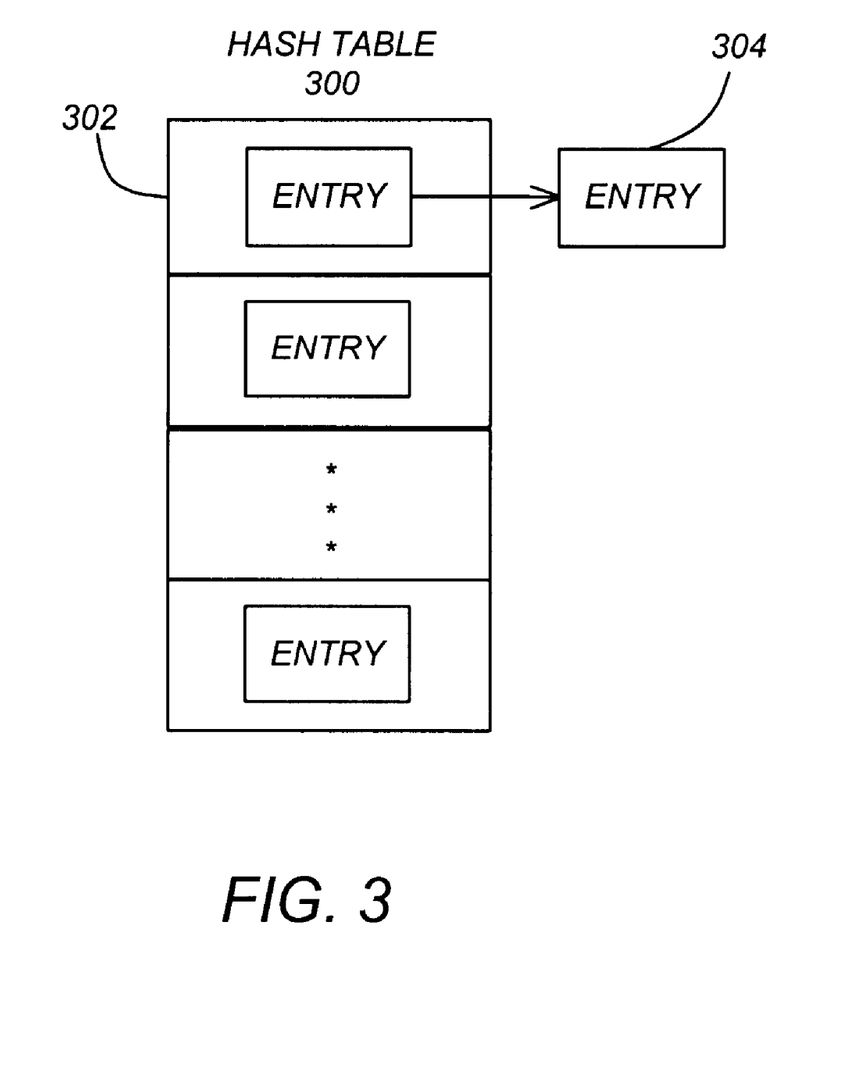
FIG. 3 schematically illustrates the structure of a hash table for macro language files according to the preferred embodiment of the present invention.

FIG. 3 schematically illustrates the structure of a hash table 300 that is comprised of a plurality of slots 302 for information about the tokenized version of the macro language files 116 and INCLUDE-files stored in the cache 114. A hash function is performed on the fully qualified file name of the macro language file 116, or of an INCLUDE-file referenced in an include section, and the results of this hash function identify an associated slot 302 in the hash table 300 for the macro language file 116 or INCLUDE-file that is to be cached 114. When one or more file names hash to the same slot 302 (i.e., they are similarly hashed), the associated entries 304 in the hash table 300 are linked together in a list.

Figure 4:
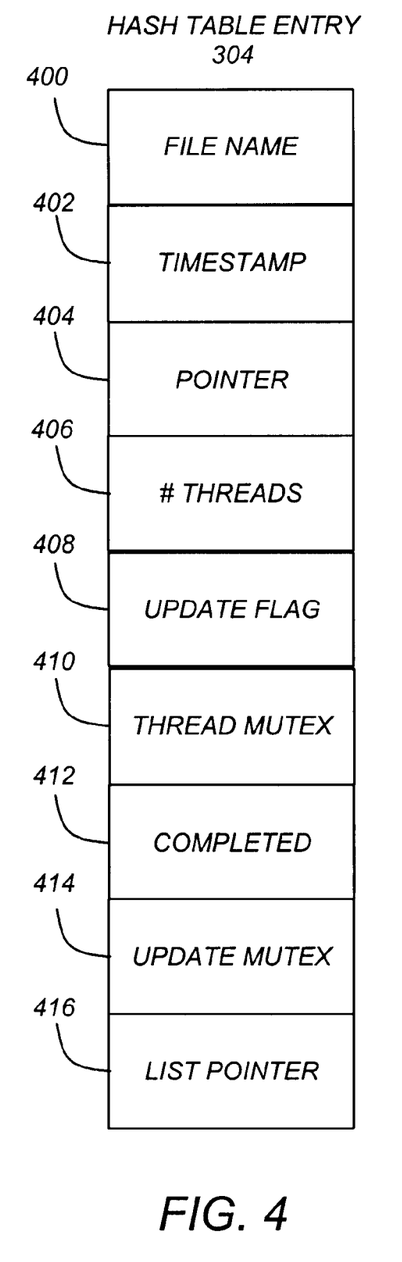
FIG. 4 schematically illustrates the structure of each entry of the hash table according to the preferred embodiment of the present invention.

FIG. 4 schematically illustrates the structure of each entry 304 of the hash table 300. Each entry 304 in the hash table 300 includes a fully qualified file name 400 of a macro language file 116 or INCLUDE-file, a timestamp 402 recording the time that the contents of the macro language file 116 or INCLUDE-file were last changed prior to being cached 114, a pointer 404 to the tokenized version of the macro language file 116 or INCLUDE-file, a count 406 of the number of threads currently processing the macro language file 116 or INCLUDE-file, a flag 408 indicating whether an update of the cached macro language file 116 or INCLUDE-file is in progress, a mutex 410 for the number of threads currently processing the macro language file 116 or INCLUDE-file and for the update in progress flag 408, a flag 412 indicating that the update operation has completed, a mutex 414 for the update operation completed flag 412, and a pointer 416 to the next entry 304 in the linked list associated with this slot 302, or a NULL value to indicate the last entry 304 of the linked list.

Mutex Array

Figure 5:
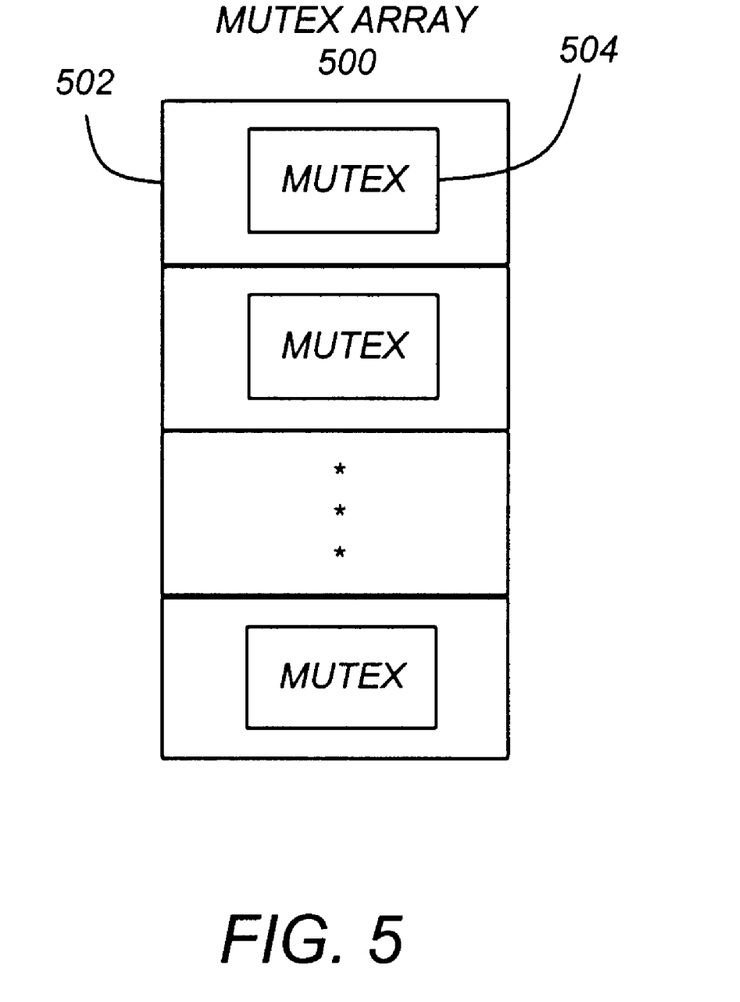
FIG. 5 schematically illustrates the structure of a mutex array for the hash table according to the preferred embodiment of the present invention.

FIG. 5 schematically illustrates the structure of a mutex array 500 that is comprised of a plurality of entries 502 for storing mutexes 504 for use in accessing the slots 302 of the hash table 300. The mutex array 500 contains a mutex 504 for each slot 302 of the hash table 300. The mutex 504 serializes the addition of new entries to the linked list of entries 304 in the associated slot 302 of the hash table 300. A new entry 304 is always added to the end of the linked list for its respective slot 302 of the hash table 300.

Replacing a Cached Macro Language File or INCLUDE-file

Flags within an entry 304 of the hash table 300 are used to enforce rules for replacing cached 114 macro language files 116 or INCLUDE-files. Threads that are currently executing the macro language file 116 or INCLUDE-file are allowed to complete, while threads that desire to replace a cached 114 macro language file 116 or INCLUDE-file wait until the number of threads currently processing the cached 114 macro language file 116 or INCLUDE-file reaches zero as indicated by the count of the number of threads currently processing the macro language file 116 or INCLUDE-file (for example, by using a "while" loop that periodically checks whether the number of threads is zero using a timer).

Once the number of threads currently processing the macro language file 116 or INCLUDE-file reaches zero and a thread obtains access to an entry 304 in the hash table 300 for a cached 114 macro language file 116 or INCLUDE-file, it blocks all other threads attempting to access the cached 114 macro language file 116 or INCLUDE-file by means of the update-in-progress flag 408. Thereafter, it replaces the cached 114 macro language file 116 or INCLUDE-file and updates the timestamp only if the tokenized version of the macro language file 116 is more current than the version in the cache 114. After replacing the cached 114 macro language file 116 or INCLUDE-file, the thread unblocks any waiting threads by setting the update-operation-completed flag 412. Mutexes 410, 414 within each entry 304 of the hash table 300 are used to serialize updates to the number of threads currently processing the macro language file 116 or INCLUDE-file, the update-in-progress flag 408, and the update-operation-completed flag 412.

Logic of the Preferred Embodiment

Figure 6:
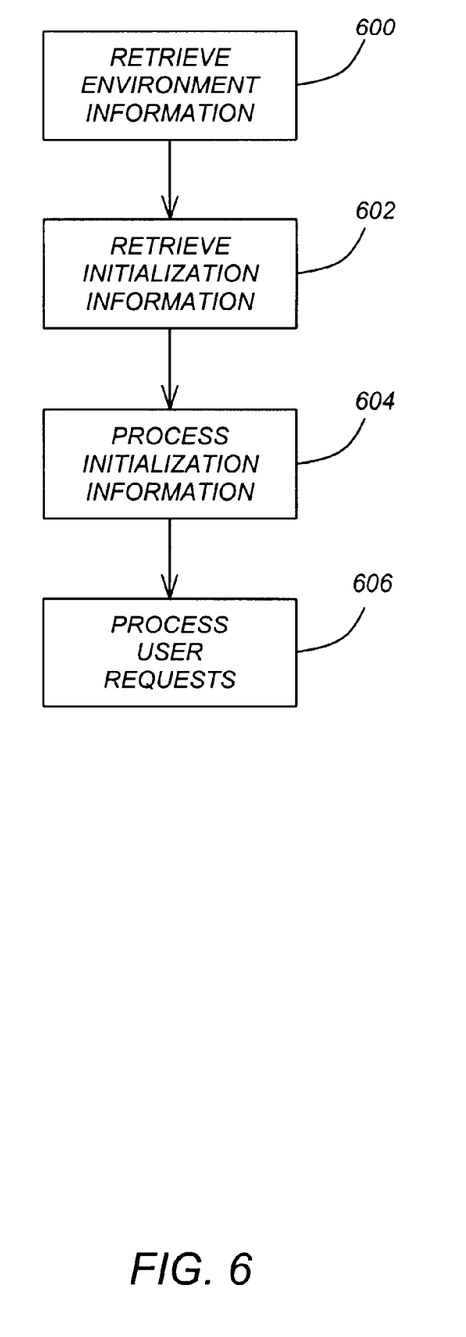
FIGS. 6, 7, and 8 are flowcharts illustrating the logic performed by the Net.Data gateway in interpreting macro language files according to the preferred embodiment of the present invention.
Figure 7:
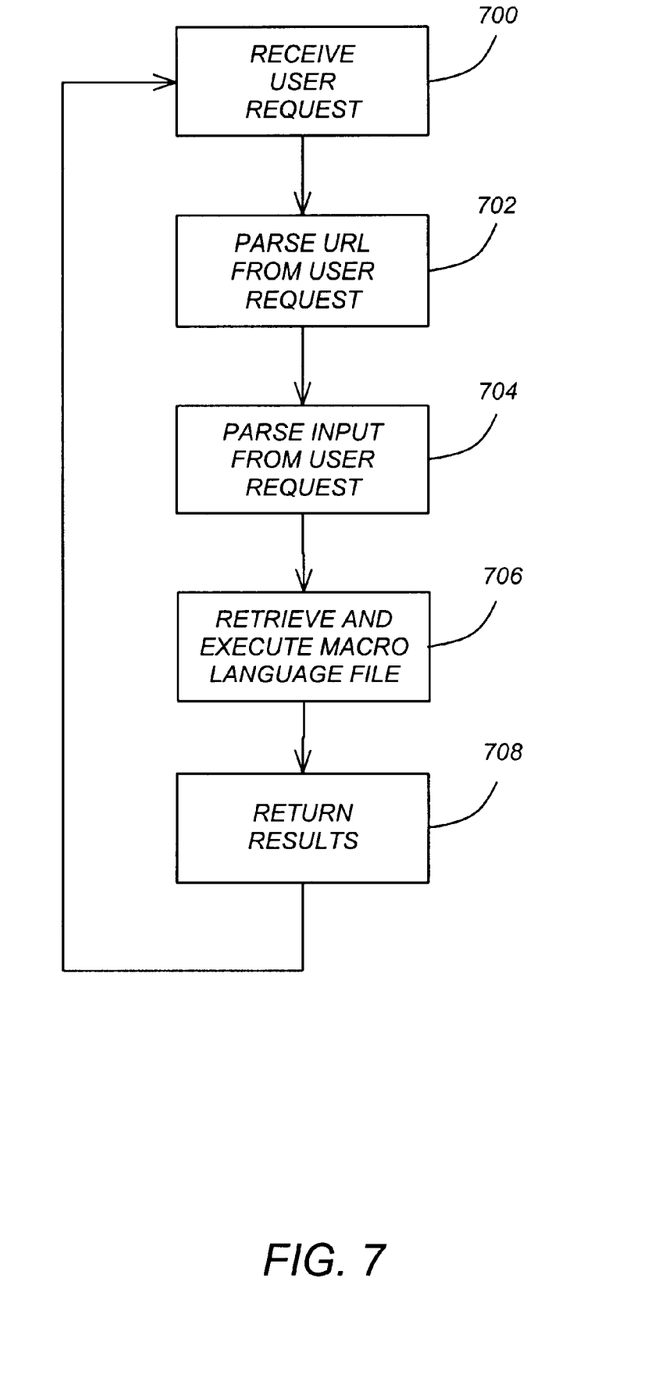
Figure 8:
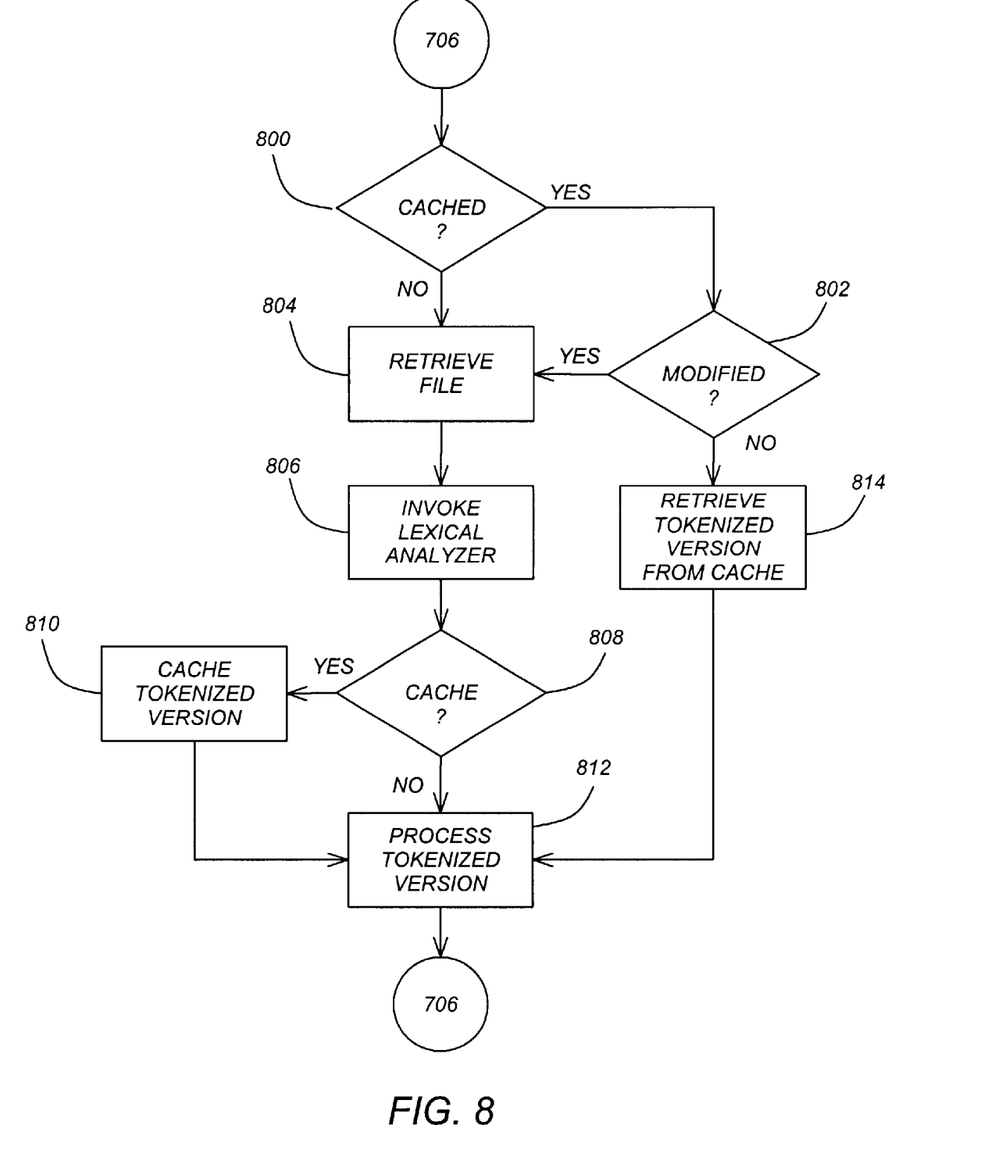

FIGS. 6, 7, and 8 are flowcharts illustrating the logic performed by the Net.Data gateway 112 in interpreting macro language files 116 according to the preferred embodiment of the present invention.

FIG. 6 is a flowchart illustrating the logic performed by the Net.Data gateway 112 according to the preferred embodiment of the present invention.

Block 600 represents the Net.Data gateway 112 retrieving environment information.

Block 602 represents the Net.Data gateway 112 retrieving its initialization information.

Block 604 represents the Net.Data gateway 112 processing its initialization information (e.g., processing its path information, a default DBMS 118 identifier, a default DBMS 118 plan name, etc.).

Block 606 represents the Net.Data gateway 112 processing user requests, as described in more detail below in FIG. 7.

FIG. 7 is a flowchart illustrating the logic performed by the Net.Data gateway 112 at Block 606 during the processing of user requests according to the preferred embodiment of the present invention.

Block 700 represents the Net.Data gateway 112 receiving a user request from the Web browser 108 via the Web server 110.

Block 702 represents the Net.Data gateway 112 parsing a uniform resource locator (URL) from the received user request, wherein the URL identifies the macro language file 116 to be executed.

Block 704 represents the Net.Data gateway 112 parsing other input from the received user request, wherein the other information controls the execution of the macro language file 116.

Block 706 represents the Net.Data gateway 112 retrieving the identified macro language file 116 and then executing the identified macro language file 116 in conjunction with the other input. This Block 706 is further described below in FIG. 8.

Block 708 represents the Net.Data gateway 112 returning the results from the executed macro language file 116 to the Web browser 108 via the Web server 110 for display to the user.

FIG. 8 is a flowchart illustrating the logic performed by the Net.Data gateway 112 at Block 706 during the execution of the identified macro language file 116 in conjunction with the other input according to the preferred embodiment of the present invention.

Block 800 is a decision block that represents the Net.Data gateway 112 determining whether a tokenized version of the identified macro language file 116 or INCLUDE-file resides in the cache 114. If so, control transfers to Block 802; otherwise, control transfers to Block 804.

Block 802 is a decision block that represents the Net.Data gateway 112 determining whether the macro language file 116 or INCLUDE-file has been modified since it was cached 114. If so, control transfers to Block 804; otherwise, control transfers to Block 814.

Block 804 represents the Net.Data gateway 112 retrieving the macro language file 116 or INCLUDE-file.

Block 806 represents the Net.Data gateway 112 invoking a lexical analyzer function to tokenize all sections of the macro language file 116 or INCLUDE-file.

Block 808 is a decision block that represents the Net.Data gateway 112 determining whether the tokenized version of the macro language file 116 or INCLUDE-file should be cached 114. If so, control transfers to Block 810; otherwise, control transfers to Block 812.

Block 810 represents the Net.Data gateway 112 storing the tokenized version of the macro language file 116 or INCLUDE-file in the cache 114.

Block 812 represents the Net.Data gateway 112 executing the tokenized version of the macro language file 116 or INCLUDE-file. In the preferred embodiment, the creation of the tokenized version of the macro language file 116 or INCLUDE-file, and the execution of the macro language file 116 or INCLUDE-file are interleaved.

Block 814 represents the Net.Data gateway 112 retrieving the tokenized version of the macro language file 116 or INCLUDE-file from the cache 114.

Thereafter, control returns to Block 706 in FIG. 7.

Conclusion

This concludes the description of the preferred embodiment of the invention. The following describes some alternative embodiments for accomplishing the present invention. For example, any type of hardware configuration could be used with the present invention. Similarly, any type of software configuration, including different software components than those described herein, could benefit from the present invention, if such software involved the execution of interpreted applications.

In summary, the present invention discloses a system, method, and article of manufacture for caching a preprocessed version of an interpreted application at the time the interpreted application is first interpreted and executed by a computer, thereby improving response time for subsequent executions of the interpreted application. The preprocessed version of the interpreted application captures all execution paths through the interpreted application, despite the fact that the first execution of the interpreted application may only exercise a subset of the possible execution paths therein. Modifications to the interpreted application are dynamically detected, so that the preprocessed version can be replaced in the cache as needed.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system for executing interpreted applications, comprising:

(a) a server for providing content for one or more client computers;

(b) a gateway for interfacing between the server and one or more database management systems and/or one or more command interpreters, wherein the gateway interprets one or more applications comprising macro language files in response to a request received from the server, and the interpreted applications access one or more databases through the database management systems or execute one or more commands through the command interpreters in order to provide content to the server, and (c) a cache, stored in a memory and accessible by the gateway, for storing tokenized versions of one or more of the macro language files for subsequent execution by the gateway, wherein the tokenized versions of the macro language files capture all execution paths through the macro language files.

2. The system of claim 1 above, wherein modifications to the macro language files are dynamically detected, so that the tokenized versions can be replaced in the cache.

3. The system of claim 1 above, wherein authority for executing the tokenized versions of the macro language files stored in the cache is verified by the gateway prior to execution.

4. The system of claim 1 above, wherein the server is a web server.

5. The system of claim 1 above, wherein gateway generates the tokenized versions of the macro language files.

6. The system of claim 1 above, wherein tokenized versions of the macro language files are cached when they are first executed.

7. The system of claim 1 above, wherein the macro language files include references to other files.

8. The system of claim 7 above, wherein the gateway generates the tokenized versions of the macro language files and the other files.

9. The system of claim 7 above, wherein remotely-located ones of the other files referenced by the macro language files are not cached.

10. The system of claim 7 above, wherein tokenized versions of the macro language files are cached when they are first executed.

11. A method for executing interpreted applications in a computer-implemented system, comprising:

(a) interpreting one or more applications comprising macro language files at a gateway in response to a request, wherein the interpreted applications access one or more databases through one or more database management systems and/or execute one or more commands through one or more command interpreters in order to provide content to a server for subsequent transmission to a client computer; and (b) storing tokenized versions of one or more of the macro language files in a cache memory accessible by the gateway for subsequent execution by the gateway, wherein the tokenized versions of the macro language files capture all execution paths through the macro language files.

12. The method of claim 11 above, wherein modifications to the macro language files are dynamically detected, so that the tokenized versions can be replaced in the cache.

13. The method of claim 11 above, wherein authority for executing the tokenized versions of the macro language files stored in the cache is verified by the gateway prior to execution.

14. The method of claim 11 above, wherein the server is a web server.

15. The method of claim 11 above, wherein the gateway generates the tokenized versions of the macro language files.

16. The method of claim 11 above, wherein tokenized versions of the macro language files are cached, when they are first executed.

17. The method of claim 11 above, wherein the macro language files include references to other files.

18. The method of claim 17 above, wherein the gateway generates the tokenized versions of the macro language files and the other files.

19. The method of claim 17 above, wherein remotely-located ones of the other files referenced by the macro language files are not cached.

20. The method of claim 17 above, wherein tokenized versions of the macro language files and the other files are cached when they are first executed.

21. An article of manufacture embodying logic for executing interpreted applications in a computer-implemented system, the logic comprising:

(a) interpreting one or more applications comprising macro language files at a gateway in response to a request, wherein the interpreted applications access one or more databases through one or more database management systems and/or execute one or more commands through one or more command interpreters in order to provide content to a server for subsequent transmission to a client computer; and (b) storing tokenized versions of one or more of the macro language files in a cache memory accessible by the gateway for subsequent execution by the gateway, wherein the tokenized versions of the macro language files capture all execution paths through the macro language files.

22. The logic of claim 21 above, wherein modifications to the macro language files are dynamically detected, so that the tokenized versions can be replaced in the cache.

23. The logic of claim 21 above, wherein authority for executing the tokenized versions of the macro language files stored in the cache is verified by the gateway prior to execution.

24. The logic of claim 21 above, wherein the server is a web server.

25. The logic of claim 21 above, wherein the gate generates the tokenized versions of the macro language files.

26. The logic of claim 21 above, wherein tokenized versions of the macro language files are cached when they are first executed.

27. The logic of claim 21 above, wherein the macro language files include references to other files.

28. The logic of claim 27 above, wherein the gateway generates the tokenized versions of the macro language files and the other files.

29. The logic of claim 27 above, wherein remotely-located ones of the other files referenced by the macro language files are not cached.

30. The logic of claim 27 above, wherein tokenized versions of the macro language files and the other files are cached when they are first executed.

* * * * *

UNITED STATES PATENT AND TRADEMARK OFFICE
CERTIFICATE OF CORRECTION

PATENT NO. : 6,832,368 B1
DATED : December 14, 2004
INVENTOR(S) : Melvin R. Zimowski It is certified that error appears in the above-identified patent and that said Letters Patent is hereby corrected as shown below:

Column 11,
Line 33, after "files" insert -- and the other files --.

Signed and Sealed this

Fifteenth Day of March, 2005

JON W. DUDAS
*Director of the United States Patent and Trademark Office*